May 18, 1965
W. F. ALLER
3,184,197
SUPPORTING DEVICE
Filed Aug. 31, 1962
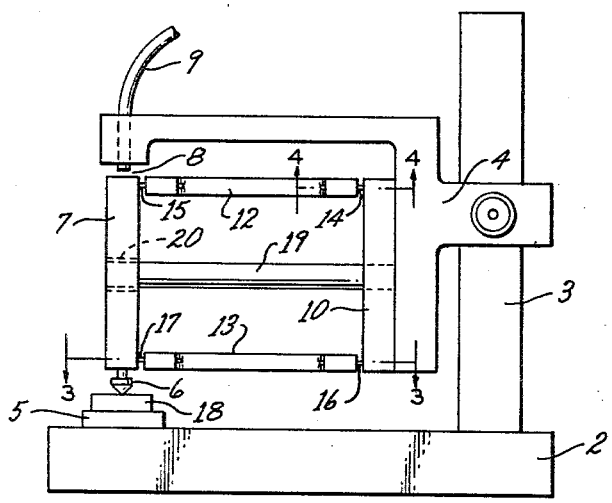
FIG.1
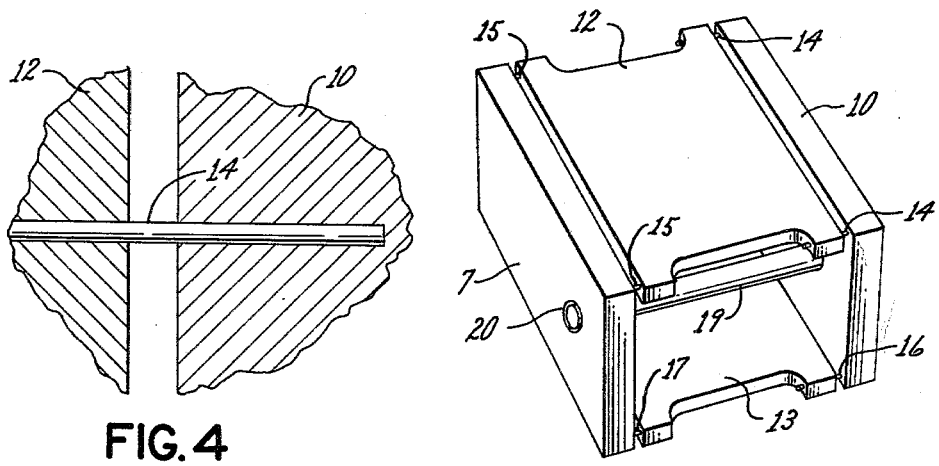
FIG.4
FIG.2
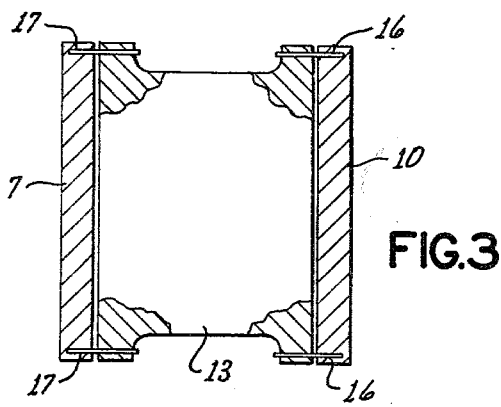
FIG.3
INVENTOR
W. F. ALLER
BY *Edward J. Noij*
HIS ATTORNEY United States Patent Office 3,184,197
Patented May 18, 1965

3,184,197
SUPPORTING DEVICE
Willis Fay Aller, Dayton, Ohio, assignor to The Sheffield Corporation, Dayton, Ohio, a corporation of Delaware
Filed Aug. 31, 1962, Ser. No. 220,692
6 Claims. (Cl. 248—204)

This invention relates to a supporting arrangement in which one member is carried in a frictionless manner for movement relative to a support.

Heretofore mechanisms have transmitted motion effectively in a frictionless manner; however, these mechanisms are expensive to manufacture. A typical example is set forth in Willis Fay Aller Patent No. 2,177,398 wherein flat spring blades are installed in shallow slots, to controlled depths, and held in position by clamping blocks. These blocks are retained by screws which are threaded into the various members involved. It is evident from the above example that such an arrangement is costly because it is necessary to machine slots, machine clamping blocks, drill, and tap holes. Also there are additional costs for the larger number of components and their assembly.

Therefore, one object of the invention is to provide an economical means of constructing an arrangement capable of providing frictionless motion of a movable member relative to a support.

Another object is to provide an economical means of constructing an arrangement capable of providing frictionless motion of a movable member relative to a support by simply drilling holes in the respective members and embedding flexible rods of circular cross section to provide their frictionless connection.

Another object of the invention is the provision of a device of such character embedding short rods of such diameter and so spaced that a broad stable base is provided in one direction but such that the flexibility of the rod permits free flexing in another direction.

Another object is the provision of a device of such character employing one or more spacing members or plates with flexible rods embedded at their ends in the parts connected.

Still another object of the invention is the provision of multiple parallel plates attached by short flexible rods embedded at their ends in a fixed and a movable member thus permitting movement only in a path generally perpendicular to the plates.

Other objects and advantages of the invention will be apparent from the following description, the appended claims, and the accompanying drawings.

In the drawings, in which the same reference characters have been applied to like parts in several views:

FIGURE 1 is a side elevation of a construction embodying the present invention.

FIGURE 2 is a perspective view of components of the present invention.

FIGURE 3 is a sectional view on the line 3—3 of FIGURE 1.

FIGURE 4 is an enlarged sectional view on the line 4—4 of FIGURE 1.

The present invention provides a simple economical device for transmitting frictionless motion of a movable member.

The invention is shown in one of its many possible applications as applied, for example, to a gage wherein a workpiece 18 which is to be measured is positioned on a work supporting anvil 5 and controls the position of a movable member 7 which is carried by support 10. The dimension of the workpiece 18 varies said movable member 7 which cooperates with a measuring apparatus to indicate the dimension involved in a conventional fashion.

Movement of said movable member is provided for by attaching it to a support using rigid connecting means such as plates with flexible rods embedded therein at their ends and in the movable member and support respectively. The device is designed so that motion of the movable member arranged in spaced relation from the support is restricted in all directions except along a desired path. An important feature of this invention involves use of parallel sets of flexible rods, which are relatively short, in combination with rigid connecting means to produce the desired effect. Another feature of this invention is the spacing of said rods a relatively large distance so as to provide a broad stable base in a transverse direction. For example, in a set consisting of a pair of rods, it is important that the rods be short enough and relatively spaced to restrict transverse motion, yet long enough to enable a free flexing motion in a path perpendicular to the plane of the rods.

The construction provided by this invention is much more economical to manufacture than present methods used to provide frictionless motion. Present methods involving flat springs directly interconnecting a support and a movable member are expensive because they involve additional components and manufacturing operations and require more time to assemble. This invention reduces the number of required components and combines simplicity of design and economy of fabrication to reduce cost.

The exemplary illustration of the present invention in a gage is presented in FIGURE 1 of the drawing which shows a suitable base 2 having a standard 3 which adjustably carries a head 4 the height of which may be readily changed in a suitable or conventional manner, suitable locking means being provided to secure the head 4 at a desired height above the work supporting anvil 5 on the base 2. With the head 4 properly positioned, a workpiece 18 arranged on the anvil 5 may be contacted by a work engaging element 6 which is rigidly attached to the movable member 7 which varies an air gap 8. This air gap is connected through tubing 9 to a precision air flow measuring device which converts air gap to a size measurement. The head 4 has a support 10 affixed thereto which has a cylindrical rigid arm 19 rigid therewith which extends through a hole 20 in the movable member 7. The diameter of this hole 20 is slightly larger than the diameter of arm 19 thus preventing the movable member 7 from excessive movement beyond a normal gaging range but permitting free motion in a gaging operation.

The movable member 7 is movably supported by and in a spaced relation from support 10. The means for movably supporting the movable member are shown in FIGURE 2 comprising first and second spaced rigid parallel connecting means such as plates 12 and 13 respectively, of equal effective length, and four pairs of flexible rods with their axes parallel in a normal and unflexed position, with the first pair of said rods 14 arranged in parallel relation in one plane and attaching the first plate 12 to the support 10, the second pair of rods 15 arranged in parallel relation in the same plane as the first pair 14 and attaching the first plate 12 to the movable member 7, the third pair of rods 16 arranged in parallel relation in another plane and attaching the second plate 13 to the support 10, the fourth pair of rods 17 arranged in parallel relation in the same plane as the third pair 16 and attaching the second plate 13 to the movable member 7. As shown each rod has a length which is only a few percent of the total distance between the support 10 and the movable member 7. Motion of the movable member 7 is thus restricted in all directions except perpendicular to the plane of flexible rod pairs 16 and 17, and this motion of the movable member is always parallel to the support and substantially rectilinear.

Rod diameter and effective length are important and the rods in a pair are relatively spaced a comparatively large distance apart thus providing a broad stable base and restricting movement except in a path generally perpendicular to a plane through the pair. The effective length of each rod in a pair, which is the distance between the parts to which they are secured, is the same. Their length is generally of the order of several times the rod diameter, as shown in FIGURE 4. In one practical application the rods employed were about .020 inch in diameter and a length about three times the diameter. Thus it is noted that in this arrangement motion of the movable member is readily accomplished in a path generally perpendicular to the plane of the rods but restricted in all other directions.

Simplicity of design and economical techniques of fabrication are present. The rods are preferably of substantially uniform circular cross section throughout all or at least the major portion of their lengths and of a suitable flexible material preferably a metallic alloy, and with cylindrical ends embedded or secured in holes of circular cross section in the parts to which they are attached, by using solder or other suitable means. This method is economical in that the rods can be made inexpensively and merely embedded securely in the various components in drilled holes.

Thus it is seen that a motion transmitting device restricting motion in all directions except along one desired path has been provided and this device can be fabricated economically.

While the form of apparatus herein described constitutes a preferred embodiment of the invention it is to be understood that the invention is not limited to this precise form of apparatus, and that changes may be made therein without departing from the scope of the invention which is defined in the appended claims.

I claim:

1. A supporting device comprising a support, a movable member spaced therefrom, and means for movably supporting the movable member comprising, a rigid connecting means spanning the major portion of said space, and a plurality of flexible rods of substantially uniform cross section arranged in sets with their axes parallel, one set of flexible rods being of equal effective length and arranged in a common plane and fixedly embedded in the connecting means and the support in holes of circular cross section, the second set of flexible rods being of equal effective length arranged in a common plane and fixedly embedded in the connecting means and the movable member in holes of circular cross section, and the spacing of said rods in each set being large compared to the effective length of the rods.

2. A supporting device as set forth in claim 1 in which the flexible rods have a circular cross section and their effective lengths are generally of the order of $1/40$ of the space between the support and movable member.

3. A supporting device as set forth in claim 1 in which the flexible rods have a circular cross section and their effective lengths are generally of the order of several times their diameter.

4. A supporting device comprising, a support, a rigid means, means supporting said rigid means on said support for movement thereon about an axis of pivoting while restraining relative movement in other directions comprising, a plurality of parallel flexible rods of substantially uniform circular cross section extending between said support and said rigid means transverse said axis arranged with their axes in parallel relation in a common plane and fixedly embedded in the rigid means and the support in holes of circular cross section with the relative spacing of said rods along said axis being large compared to their effective length, the effective length of the rods being generally of the order of several times their diameter, thereby supporting said rigid means for pivoting movement transverse to the plane of the rods about said axis through limited flexing thereof while providing a stable base against relative movement in other directions.

5. A supporting device comprising a support, a movable member movably supported thereby and spaced therefrom, and a means for movably supporting the movable member comprising a plurality of relatively spaced rigid connecting means of equal effective length spanning the major portion of said space, and a plurality of parallel flexible rods of substantially uniform cross section attaching the connecting means to the support and movable member arranged in parallel sets, each set arranged so the rods are in the same plane parallel to each other, all of said flexible rods being fixedly embedded at their ends in holes of circular cross section at all attach points, and the spacing of all flexible rods in each set being large compared with their effective length so that motion is restricted in all directions except perpendicular to a plane of any set, and all flexible rods embedded in the support being the same effective length, and all flexible rods embedded in the movable member being the same effective length.

6. A supporting device comprising a support, a movable member movably supported thereby and spaced therefrom, and a means for movably supporting the movable member comprising first and second spaced rigid parallel plates of equal effective length, and four parallel pairs of flexible rods with the first pair of said rods arranged in parallel relation in one plane and attaching the first plate to the support, the second pair of rods arranged in parallel relation in the same plane as the first pair and attaching the first plate to the movable member, the third pair of rods arranged in parallel relation in another plane and attaching the second plate to the support, the fourth pair of rods arranged in parallel relation in the same plane as the third pair and attaching the second plate to the movable member, and each pair of rods being equally spaced apart a distance which is large compared to the effective length of the rods, so that motion of said movable member is restricted in all directions except perpendicular to the rods, all rods being of generally uniform cross section, and equal effective length generally of the order of several times their diameter, and embedded in holes of circular cross section at all attach points.

References Cited by the Examiner

UNITED STATES PATENTS 2,177,398  10/39  Aller _____ 74—469
2,932,482  4/60   Dickie _____ 248—358
3,057,592  10/62  Thrasher _____ 248—358

CLAUDE A. LE ROY, *Primary Examiner.*